Jan. 15, 1963   E. E. SCHROEDER   3,073,247
TRANSFORMER OIL CIRCULATING PUMP
Filed Nov. 8, 1960
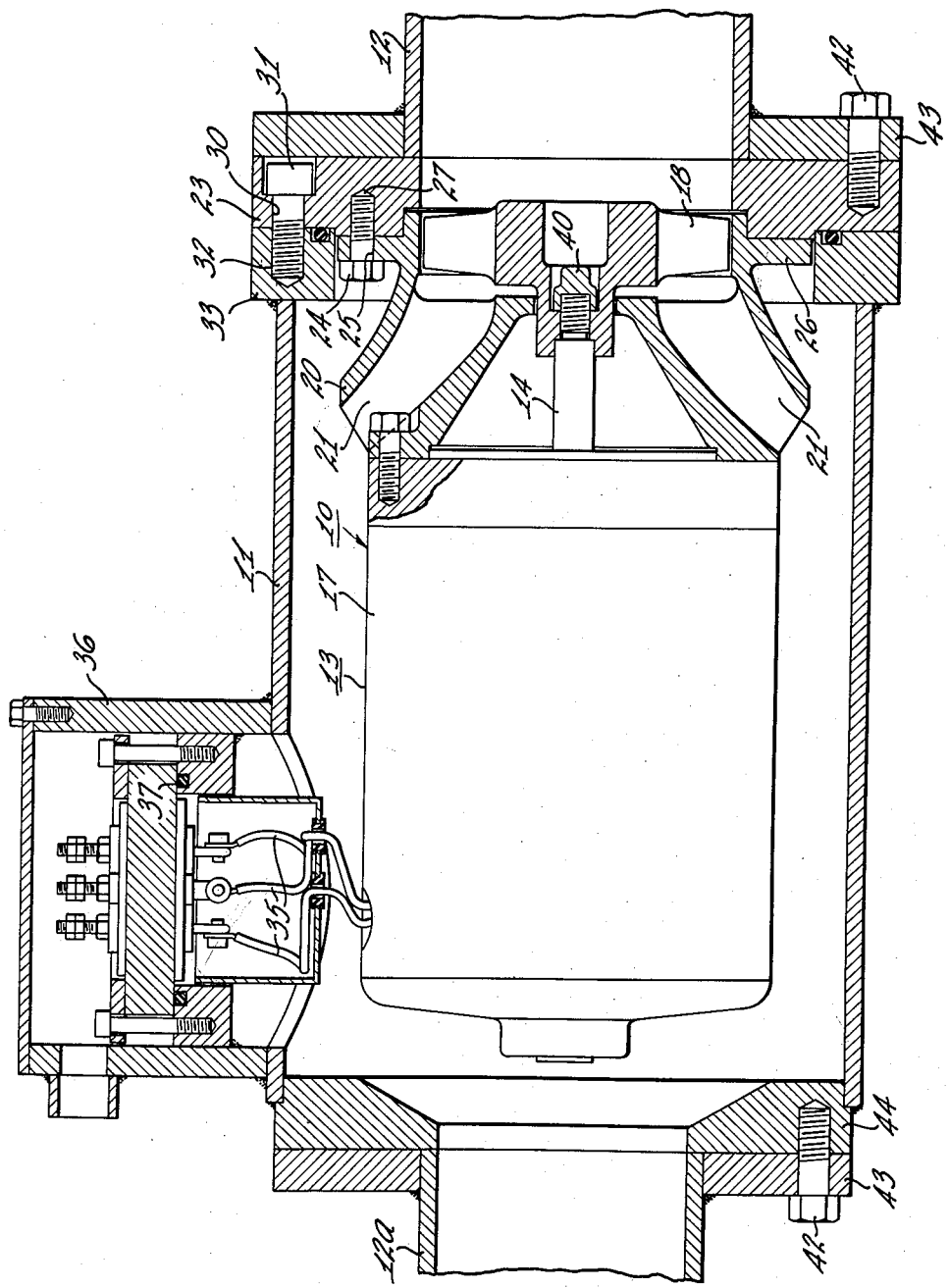
Inventor
Earle E. Schroeder
by Robert B. Benson
Attorney

3,073,247
TRANSFORMER OIL CIRCULATING PUMP
Earle E. Schroeder, Norwood, Ohio, assignor to Allis-Chalmers Manufacturing Company, Milwaukee, Wis.
Filed Nov. 8, 1960, Ser. No. 68,027
4 Claims. (Cl. 103—87)

This invention relates generally to centrifugal pumps. More specifically this invention relates to in-line centrifugal pumps.

In-line motor pump units are pumps directly connected to a motor and positioned wholly within the conduit carrying the fluid being propelled by the pump. In pumps of this type the fluid being propelled flows either around the outside of the casing or directly through the motor. Most in-line motor pump units are extremely difficult to assemble within the conduit itself.

This invention overcomes the above described problem by providing a motor pump unit which is completely assembled and mounted on an annular disk. The entire unit is then inserted within a fluid carrying conduit and mounted to a flange at the rim of the conduit. The conduit is then inserted into and becomes a part of the pipe line. This arrangement makes it much easier to assemble the in-line motor pump unit initially and to remove and replace it when service is required.

Therefore, it is the object of this invention to provide a new and improved motor pump unit.

Another object of this invention is to provide a new and improved in-line motor pump unit.

Another object of this invention is to provide a new and improved in-line motor pump unit that is easier to assemble in the fluid carrying conduit than prior art motor pump units.

Other objects and advantages of this invention will be apparent from the following description when taken in connection with the attached drawing which is a side sectional view of a motor pump unit of this invention mounted within a fluid carrying conduit.

As shown in the drawing, the motor pump unit 10 of this invention is mounted within a conduit 11 which is inserted into and forms a part of the pipe line 12, 12a. The motor pump unit 10 comprises an electric motor 13 having a shaft 14 extending therefrom at one end. The motor 13 is a submersible motor well known in the art and is illustrated as being surrounded by a suitable housing or casing 17. Pumping means such as a screw pump impeller 18 are mounted on the extension of the shaft 14 for rotation therewith.

A diffuser 20 is mounted on the motor casing 17 and extends to and encircles the impeller 18. The diffuser 20 has a plurality of outwardly extending passageways 21 for directing the fluid impelled by the impeller outwardly around the motor 13 and longitudinally through the conduit 11 in which the motor is positioned. The diffuser 20 also serves as a bracket for mounting the entire unit 10 on an annular mounting plate 23. The diffuser 20 is connected to the plate 23 by suitable means such as the bolts 24 extending through arcuately spaced apertures 25 in an outwardly extending flange 26 on the diffuser and engaging threaded holes 27 in the mounting plate 23. The plate 23 extends outward beyond the diameter of the motor and diffuser and has a series of arcuately spaced holes 30 near its periphery through which bolts 31 extend and engage aligned threaded holes 32 in a ring or flange 33 on the conduit 11 for connecting the ring to the conduit. In this position the entire unit is positioned within the fluid carrying conduit and is held thereby the bolts 31 engaging flange 33 on the conduit.

Suitable leads 35 from the motor are brought out through the conduit box 36 for connection to a source of power. The conduit box is sealed off from the fluid being pumped by methods well known in the motor art such as the O-ring seal 37.

In assembly the diffuser 20 is mounted on to the motor casing and then the impeller is positioned on the shaft extension and mounted thereon by the nut 40 that engages the threaded portion of the shaft. The diffuser is then connected to the mounting ring 23 by engaging bolts 24. Then the entire unit 10 is positioned within the conduit 11 and mounted therein by engaging bolts 31 in the flange 33. The conduit 11 is then inserted in the pipe line 12 and connected thereto by means of the bolts 42 that extend through holes in pipe flanges 43 and engage threaded holes in flange 44 or mounting plate 23.

As has been described above, the entire unit can be assembled and mounted on the ring before being positioned in the conduit. Furthermore, the entire motor pump unit and conduit can be positioned in or removed from the pipe line without dismantling any part of the assembled unit. Hence, the motor pump unit of this invention is easier to assemble and connect into a pipe line than similar prior art units.

In operation, as the liquid is flowing through the pipe line 12 it enters the inlet of the impeller and is propelled by the impeller through the passageways 21 in the diffuser 20. The fluid then flows around the motor 13 in the conduit 11 and then into the pipe line 12a.

Although but one embodiment of this invention has been illustrated and described, it will be apparent to those skilled in the art that various modifications and changes can be made herein without departing from the spirit of the invention or the scope of the appended claims.

Having now particularly described and ascertained the nature of my said invention and the manner in which it is to be performed, I declare that what I claim is:

1. An in-line motor pump unit comprising an annular conduit, a motor positioned within said conduit and having a shaft extending therefrom, a pump impeller mounted on said shaft, a diffuser mounted on said motor and positioned intermediate said motor and said impeller, said diffuser having passages therein for directing fluid from said impeller, a mounting plate detachably connected to said diffuser and having a radial outwardly extending portion, means for detachably connecting said outwardly extending portion of said mounting plate to one end of said conduit to mount said motor and diffuser within said conduit.

2. An in-line motor pump unit comprising a motor having a shaft extending therefrom, a pump impeller mounted on said shaft, a diffuser mounted on said motor and positioned intermediate said motor and said impeller, said diffuser having passages therein for directing fluid from said impeller, a mounting plate detachably connected to said diffuser and having a radial outwardly extending portion, said outwardly extending portion extending beyond the diameter of said diffuser and motor whereby said motor and diffuser can be mounted within a conduit by connecting said outwardly extending portion to the conduit.

3. An in-line motor pump unit comprising an annular conduit, a motor positioned within said conduit and having a shaft extending therefrom, a pump impeller mounted on said shaft, a diffuser mounted on said motor and positioned intermediate said motor and said impeller, said diffuser having passages therein for directing fluid from said impeller, a mounting plate detachably connected to said diffuser and having an outwardly extending portion, said outwardly extending portion extending beyond the diameter of said diffuser and motor, a ring mounted on said conduit and means detachably connecting said plate to said ring to mount said motor and diffuser in said conduit.

4. The unit of claim 1 wherein said mounting plate and said other end of said conduit have means for detachably connecting said unit into a pipe line.

References Cited in the file of this patent

UNITED STATES PATENTS

| | | |
|---|---|---|
| 1,926,446 | Klosson | Sept. 12, 1933 |
| 2,492,141 | Gaylord | Dec. 27, 1949 |
| 2,911,918 | Reed | Nov. 10, 1959 |